United States Patent
Nigazawa et al.

(10) Patent No.: US 6,671,573 B2
(45) Date of Patent: Dec. 30, 2003

(54) NUMERICAL CONTROLLER AND METHOD FOR CONTROLLING THE SHAFT OF NUMERIC CONTROLLER

(75) Inventors: Hiromichi Nigazawa, Tokyo (JP); Tomomitsu Niwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/203,034

(22) PCT Filed: Dec. 14, 2000

(86) PCT No.: PCT/JP00/08864

§ 371 (c)(1),
(2), (4) Date: Aug. 5, 2002

(87) PCT Pub. No.: WO02/48811

PCT Pub. Date: Jun. 20, 2002

(65) Prior Publication Data

US 2003/0014151 A1 Jan. 16, 2003

(51) Int. Cl.$^7$ ................................................ G06F 19/00
(52) U.S. Cl. ..................... 700/193; 318/625; 318/568.2
(58) Field of Search .............................. 700/193, 190, 700/187–189, 159; 318/568.22, 625

(56) References Cited

U.S. PATENT DOCUMENTS

| | | | | |
|---|---|---|---|---|
| 5,378,968 A | * | 1/1995 | Ezawa et al. | 318/568.1 |
| 5,888,037 A | * | 3/1999 | Fujimoto et al. | 700/188 |
| 6,046,566 A | * | 4/2000 | Sonoda et al. | 318/625 |
| 6,341,245 B1 | * | 1/2002 | Ueta et al. | 700/194 |
| 6,456,896 B1 | * | 9/2002 | Ito et al. | 700/193 |
| 6,471,451 B2 | * | 10/2002 | Kojima et al. | 700/175 |
| 6,539,275 B1 | * | 3/2003 | Mizuno et al. | 700/170 |

FOREIGN PATENT DOCUMENTS

| | | |
|---|---|---|
| JP | 3-113156 | 5/1991 |
| JP | 8-272415 | 10/1996 |
| JP | 11-58091 | 3/1999 |

* cited by examiner

Primary Examiner—Leo Picard
Assistant Examiner—Zoila Cabrera
(74) Attorney, Agent, or Firm—Sughrue Mion, PLLC

(57) ABSTRACT

In the movable shaft (32) constructed by a plurality of motion modules (31), since the moving command based on the machining program (1) in unit of the movable shaft like the prior art is converted into moving commands of the motion modules (31) to control this movable shaft (32), the machining can be executed if the machining for the movement of the movable shaft is defined like the machining program in the prior art. Also, assignment of a plurality of motion modules (31) to the movable shaft (32) can be set arbitrarily and then the pulse distribution to the movable shaft (32) is executed in response to this assignment. In addition, if the failure is caused in the motion module (31), such motion module (31) can be disconnected.

6 Claims, 12 Drawing Sheets

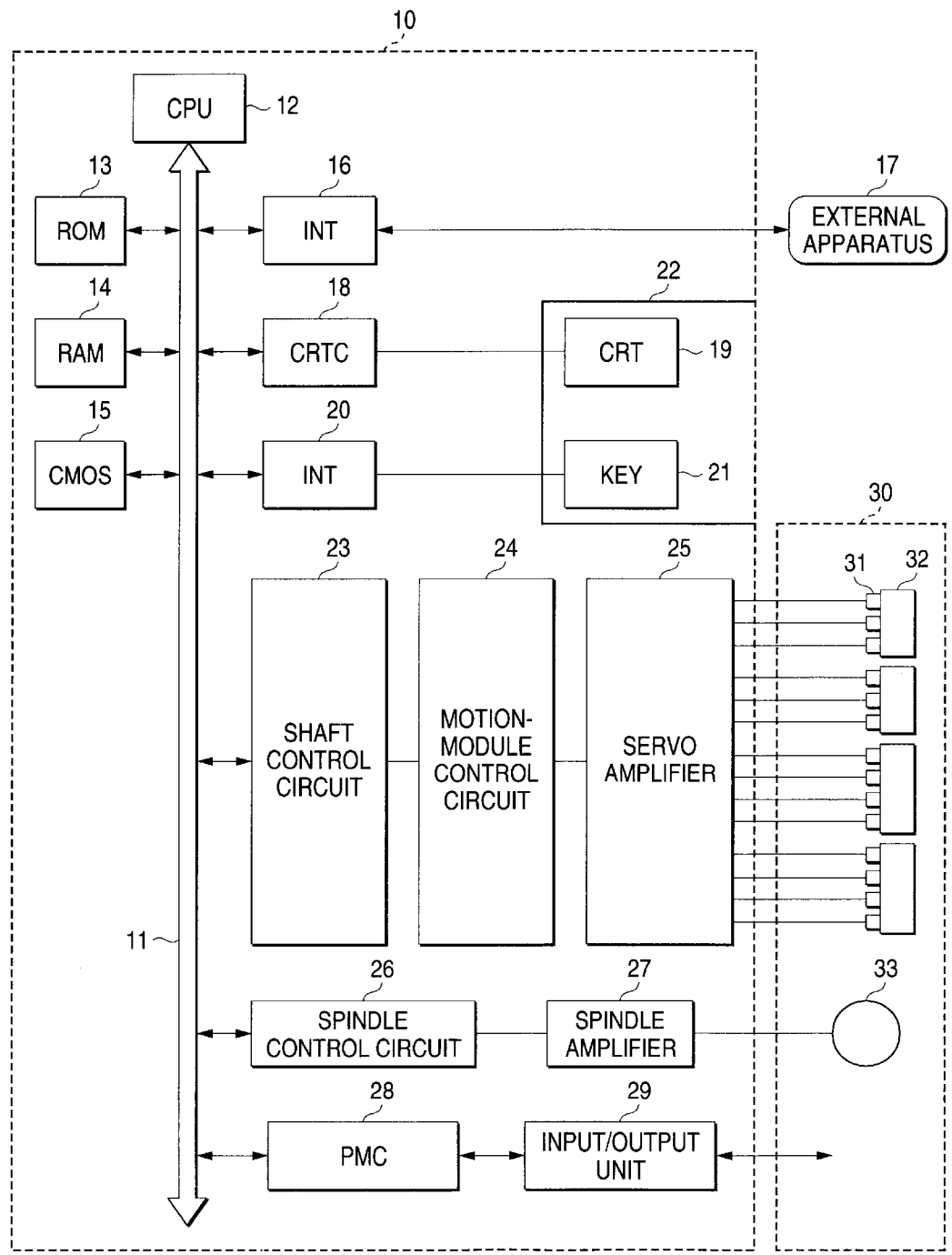

MOVABLE-SHAFT CORRELATION TABLE

| | | | |
|---|---|---|---|
| #1 | X | 0 | |
| #2 | X | 0 | ← 40 |
| #3 | X | 0 | |
| #4 | Y | 0 | |
| #5 | Y | 0 | |
| #6 | Y | 0 | |
| #7 | Z | 0 | |
| #8 | Z | 0 | |
| #9 | Z | 0 | |
| #10 | Z | 0 | |
| #11 | C | 0 | |
| #12 | C | 0 | |
| #13 | C | 0 | |
| #14 | C | 0 | |

↑ 41    ↑ 42    ↑ 43

NUMBER-OF-DISCONNECTABLE
SHAFT SETTING TABLE

| X | 1 | 0 |
|---|---|---|
| Y | 0 | 0 |
| Z | 2 | 1 |
| C | 1 | 1 |

50

51  52  53

NUMERICAL CONTROLLER AND METHOD FOR CONTROLLING THE SHAFT OF NUMERIC CONTROLLER

TECHNICAL FIELD

The present invention relates to a numerical control system and, more particularly, a shaft control method in the numerical control system applied in the case that each movable shaft is moved by a plurality of motion modules.

BACKGROUND ART

The numerical control system executes the numerical control process based on the machining program and applies the machining to the work in pursuance of the command by driving the machine tool according to result of the process.

FIG. 9 is a block diagram showing a hardware of the numerical control system in the prior art. In FIG. 9, 10 is the numerical control system. The microprocessor (CPU) 12 is the control center of the overall numerical control system 10, and reads the system program stored in the ROM 13 via the bus line 11, and executes the control of the numerical control system 10 according to this system program. The temporary computation data, the display data, etc. are stored in the RAM 14. The machining program, the tool data, various parameters, etc. are stored in the CMOS 15. The CMOS 15 is always backed up by the battery (not shown), and thus the stored data are held as they are when the power supply of the numerical control system 10 is turned OFF.

The interface 16 is the interface for the external apparatus, and the external apparatus 17 such as the floppy disk drive (FD), the personal computer (PC), or the like is connected to the interface 16. The external apparatus 17 such as the floppy disk drive (FD), the personal computer (PC), or the like can input/output the machining program, the tool data, various parameters, etc. into/from the numerical control system 10.

The graphic control circuit (CRTC) 18 converts the digital data such as present positions of respective shafts, the alarm, the machining program, various parameters, image data, etc. into the image signals and then outputs them. This image signals are supplied to the CRT 19 on the operation board 22 on the numerical control system 10, and then displayed on the CRT 19. The keyboard control portion 20 receives the data from the keyboard 21 on the operation board 22 and then transmits the data to the microprocessor 12.

The shaft control circuit 23 receives the moving commands of respective shafts from the microprocessor 12, and then outputs such moving commands of respective shafts to the servo amplifier 25. The servo amplifier 25 receives these moving commands, and then drives the servo motors 34 of respective shafts installed onto the machine tool 30. The pulse coder (not shown) to sense the position is built in the servo motor 34, and the position signal is fed back from this pulse coder as the pulse train. The velocity signal can also be generated by F/V (frequency/velocity)—converting this pulse train. In FIG. 9, the feedback lines of these position signals and the velocity feedback lines are omitted. The servo motors 34 are provided to the X-axis, the Y-axis, the Z-axis, and the C-axis respectively.

The spindle control circuit 26 receives the commands such as the spindle rotation command, the spindle orientation command, etc. and then outputs the spindle velocity signal to the spindle amplifier 27. The spindle amplifier 27 receives this spindle velocity signal and then causes the spindle motor 33 to rotate at the instructed rotation speed. Also, the spindle amplifier 27 positions the spindle at a predetermined position in response to the orientation command.

The programmable machine controller (PMC) 28 is built in the numerical control system 10, and controls the machine based on the sequence program that is constructed in the ladder format. In other words, the programmable machine controller (PMC) 28 converts the M command, the S command, and the T command, which are instructed by the machining program, into the signals required for the sequence program on the machine side, and then outputs the signals from the I/O unit 29 to the side of the machine tool 30. These output signals operate various devices on the machine side. Also, the programmable machine controller (PMC) 28 receives the signals from the limit switch on the side of the machine tool 30, the switches on the machine operation panel, etc., and then transmits the signals which are subjected to the necessary process to the microprocessor 12.

In recent years, the small and high-performance product that employs the linear motor, or the like as the motion module can be supplied. Also, the numerical control system can attain the extremely high speed in the process with the higher performance of the microprocessor 12, and thus can simultaneously control the good many shafts. For example, as shown in FIG. 10, the machine having the configuration in which respective movable shafts (Z axis, C axis) are moved by a plurality of motion modules has been invented. In the case of FIG. 10, the configuration in which respective movable shafts in the Z axis and the C axis are moved by a plurality of motion modules is employed.

FIGS. 11A to 11C shows the example of the configuration in which the linear movable shaft is moved by a plurality of motion modules. FIG. 11A is the example of the configuration in which a plurality of motion modules 31 are arranged with respect to one movable shaft in series with the moving direction of the movable shaft. Since respective motion modules 31 can apply the force to the movable shaft 32 in the directions indicated by the arrow, the movable shaft 32 can be moved in the directions indicated by the arrow.

FIG. 11C is the example of the configuration of the multipolar linear DC motor. This linear DC motor has the configuration that the armature (mover) 44, which corresponds to the primary side of the linear motor, is moved on the field (stator) 45, in which the N-pole and the S-pole of the magnet that correspond to the secondary side of the linear motor are alternatively arranged.

FIG. 11B is the example of the configuration in which the linear movable shaft constructed by the linear motor shown in FIG. 11C is moved by a plurality of motion modules. In other words, a plurality of armatures (movers) 44 that correspond to the primary side of the linear motor are fixed to the linear movable shaft 32, and the field (stator) 45 that corresponds to the secondary side of the linear motor is provided below the armatures (movers) 44. The linear movable shaft 32 can be moved by the thrust, that a plurality of armatures (movers) 44 receive from the field (stator) 45, in the direction indicated by the arrow.

Also, FIG. 12A is the example of the configuration in which a plurality of motion modules 31 are arranged with respect to one movable shaft in parallel with the moving direction of the movable shaft. In this case, like FIG. 11A, since respective motion modules 31 apply the force to the movable shaft 32 in the direction indicated by the arrow, the movable shaft 32 can be moved in the direction indicated by the arrow.

FIG. 12B is the example of the configuration in which the linear movable shaft constructed by the linear motor shown in FIG. 11C is moved by a plurality of motion modules. In other words, a plurality of armatures (movers) 44 that correspond to the primary side of the linear motor are fixed to the linear movable shaft 32, and in this case the fields (stators) 45 that correspond to the secondary side of the linear motor are provided below the armatures (movers) 44 to correspond to the armatures (movers) 44 respectively. The linear movable shaft 32 can be moved by the thrust, that a plurality of armatures (movers) 44 receive from the corresponding field (stator) 45 respectively, in the direction indicated by the arrow.

FIG. 13 is the example of the configuration in which the rotational movable shaft is moved by a plurality of motion modules. A plurality of motion modules 31 are arranged with respect to one rotational movable shaft in the circular direction of the movable shaft. The movable shaft 32 can be rotated by applying the force to the movable shaft 32 from respective motion modules 31 in the direction indicated by the arrow.

The motion module is the servo mechanism as shown in FIG. 14. The moving command is output from the motion-module control device 24 to the servo amplifier 25. The servo amplifier 25 receives this moving command to drive the servo motor 34. The position sensor 35 is fitted to the servo motor 34, and thus the position signal is fed back from the position sensor 35 as the pulse train. The configuration consisting of the servo motor 34 and the position sensor 35 corresponds to the motion module 31.

In case a large torque is needed to move the movable shaft, the large-size motor is required to generate the large torque. Meanwhile, in the case that one movable shaft is moved by a plurality of motion modules, the necessary motor can be constructed by a plurality of small-size motors if a sum of torques of respective motors may provide the necessary torque. If doing so, the occupied space of the motor can be considerably reduced rather than the case where the large-size motor is employed.

Also, as shown in FIGS. 12A and 12B, it is possible to move the movable shaft by applying the force uniformly to the movable shaft, and also it is possible to move the movable shaft with good balance. In particular, if the movable shaft is large, the deflection of the movable shaft, etc. can be prevented in contrast to the case where the movable shaft is moved by one motion module, like the prior art. Thus, the employment of a plurality of motion modules is effective to prevent the deflection of the movable shaft.

The normal numerical control system is constructed on the premise that each movable shaft is moved by a single motion module respectively. Also, in the machining program of the numerical control system, the machining operation is defined by defining the motion of each movable shaft. For this reason, there is the problem that, in the numerical control system in the prior art, the machining program cannot deal with the multi-shaft control such that each movable shaft is constructed by a plurality of motion modules.

In order to overcome this problem, there is proposed the system in which the moving command issued to the movable shaft is distributed to respective motion modules that correspond to the movable shaft, by providing the special circuit to respective motion modules constituting the movable shaft. However, in this system, there is the problem that the special distributing circuit must be provided individually according to the configurations of the movable shaft and the motion modules.

In the normal numerical control system, the machining must be interrupted when the failure is caused merely in one motion module. This is because each movable shaft is moved by a single motion module respectively in the normal numerical control system and thus it is difficult to move the movable shaft because of the failure of the motion module. In this case, the motion module has the relatively high failure occurring rate in the numerical control system. Thus, if the system is constructed by a large number of motion modules, the failure occurring rate becomes high as the overall system. As a result, there is the problem that the reduction in the reliability of the overall system is bought about.

DISCLOSURE OF THE INVENTION

The present invention has been made to overcome above problems, and it is an object of the present invention to provide a shaft control method in the numerical control system that is capable of employing a normal machining program, which provides the definition of the machining operation, as it is by defining a motion of each movable shaft even in the situation that each movable shaft consists of a plurality of motion modules.

Also, it is another object of the present invention to provide a shaft control method in the numerical control system that is capable of controlling the movable shaft by providing the redundancy to the motion modules which cause the movable shaft to move even when the failure occurs in some motion modules.

In order to achieve this object, a numerical control system in which one movable shaft is moved by a plurality of motion modules, comprises a storing means for storing a machining program for the movable shaft, a storing means for storing a movable-shaft correlation table that converts a moving command given in unit of the movable shaft based on the machining program into individual moving commands of the motion modules, and a motion-module controlling means for controlling the motion modules based on the moving commands converted by the movable-shaft correlation table.

Also, a numerical control system further comprises a setting means for setting correlations between the movable shaft and a plurality of motion modules into the movable-shaft correlation table.

Also, a numerical control system further comprises a failure sensing means for sensing a failure of the motion modules, a servo-off execution commanding means for providing a servo-off command that executes servo-off of a defective motion module when the failure is sensed, and a motion-module disconnecting means for disconnecting the defective motion module.

Also, the servo-off execution commanding means executes the servo-off of the defective motion module and brings the defective motion module into a free-running state.

Also, a numerical control system further comprises a disconnectable shaft number setting table for setting a number of disconnectable motion modules every movable shaft that is moved by a plurality of motion modules, and an alarm outputting means for outputting an alarm when a number of the motion modules, which are disconnected since the failure is caused therein, exceeds a value that is stored in the disconnectable shaft number setting table.

Also, a shaft control method in a numerical control system comprising the steps of obtaining a moving command given in unit of the movable shaft based on a machining program, converting the moving command into individual moving commands of a plurality of motion modules, which move the movable shaft, based on a movable-shaft correlation table, and controlling respective motion modules based on individual converted moving commands of the motion modules.

BRIEF DESCRIPTION OF THE DRAWINGS

FIG. 1 is a block diagram showing a hardware of a numerical control system according to an embodiment 1 of the present invention.

BEST MODES FOR CARRYING OUT THE INVENTION

Embodiments of the present invention will be explained with reference to the accompanying drawings hereinafter.
Embodiment 1

Figure 9:
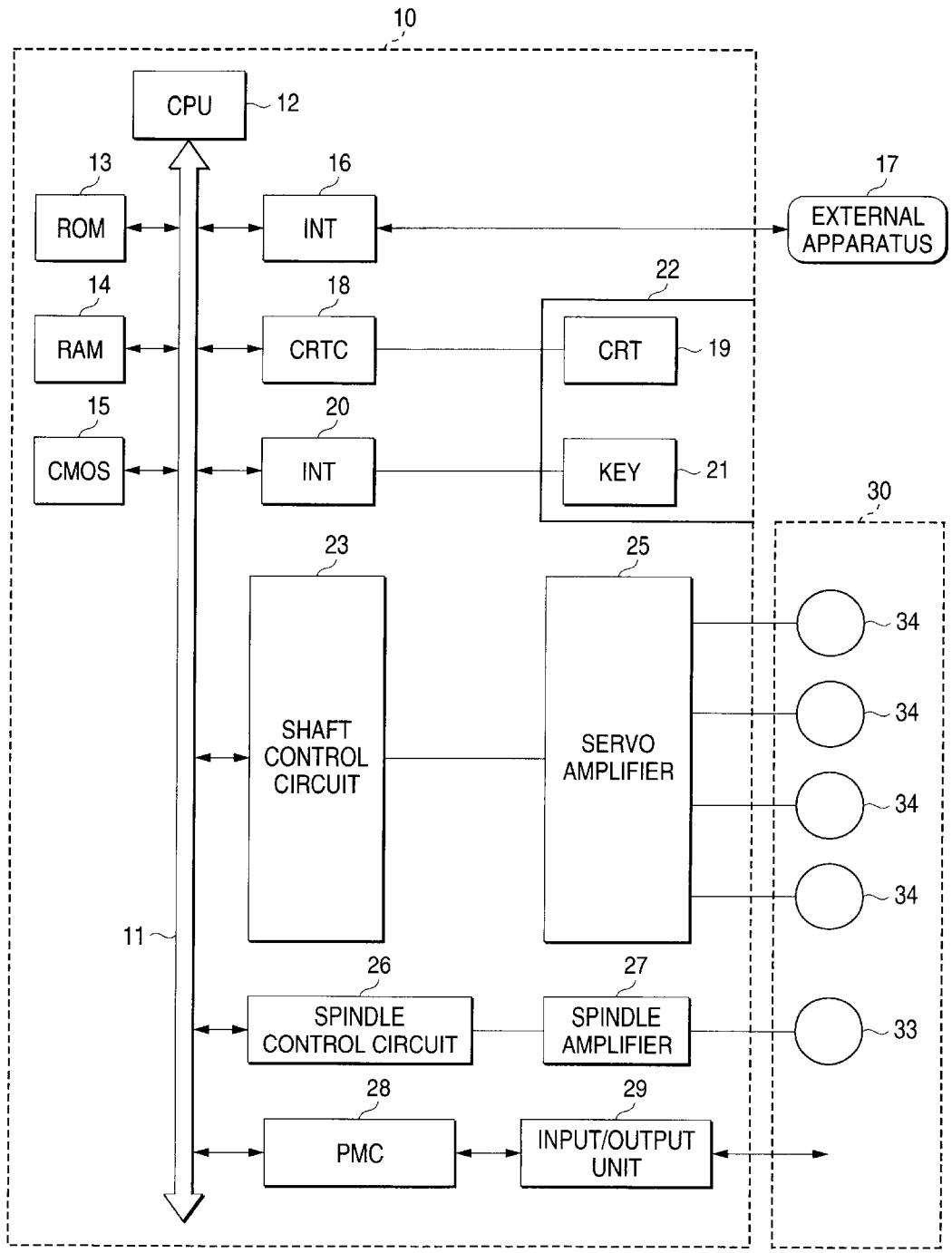
FIG. 9 is a block diagram showing a hardware of the numerical control system in the prior art.
Figure 10:
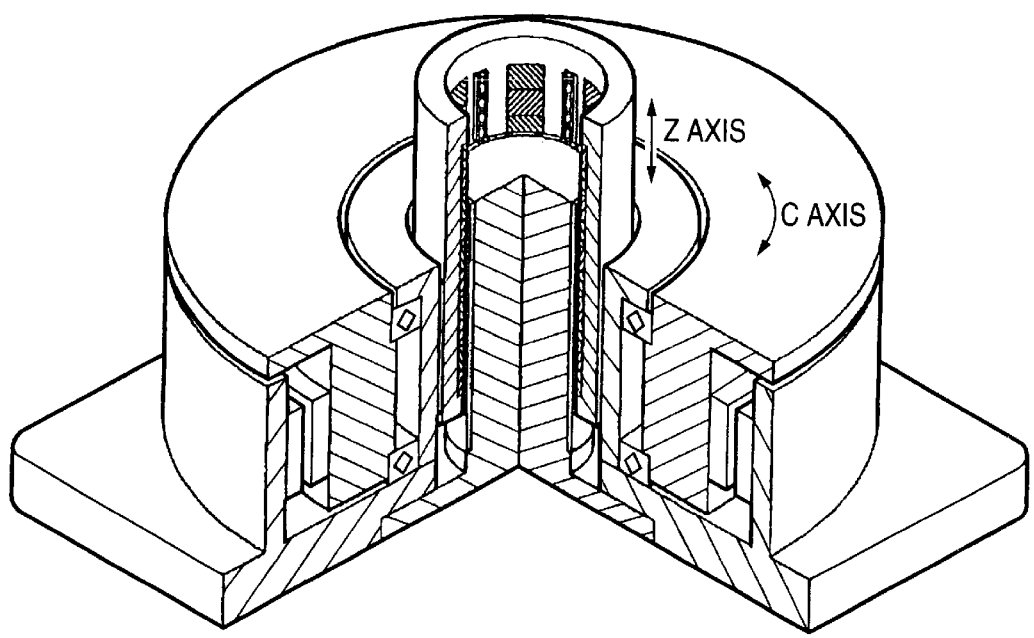
FIG. 10 is a perspective view showing a configurative example in which respective movable shafts are moved by a plurality of motion modules.
Figure 11A:
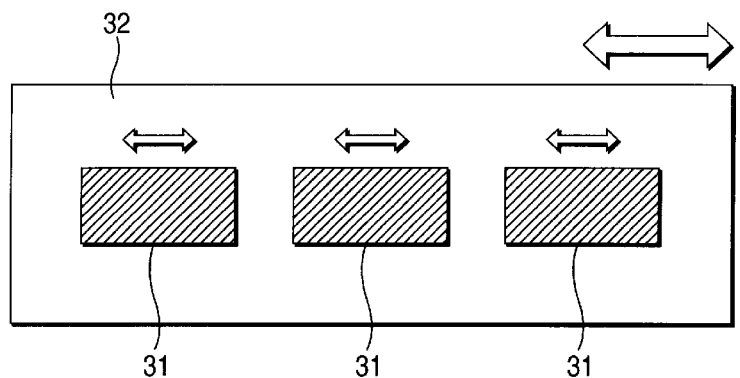
FIGS. 11A to 11C are views showing a configuration in which a linear movable shaft is moved by a plurality of motion modules.
Figure 11B:
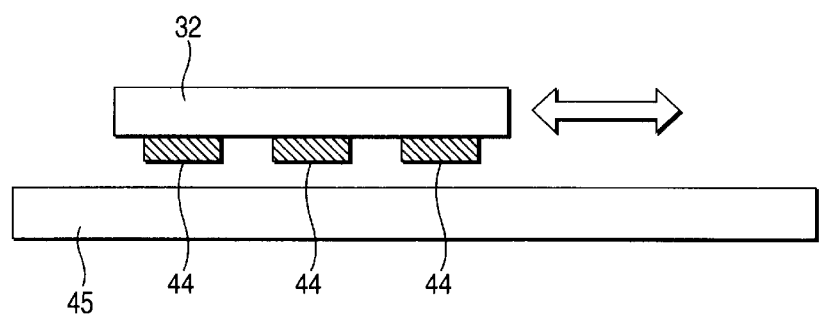
Figure 11C:
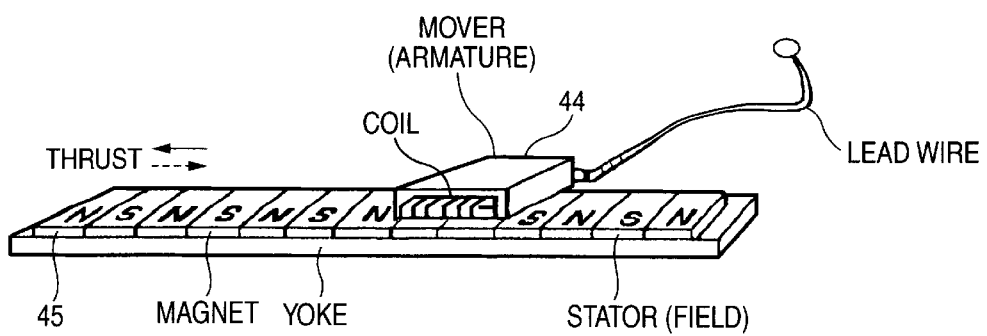
Figure 12A:
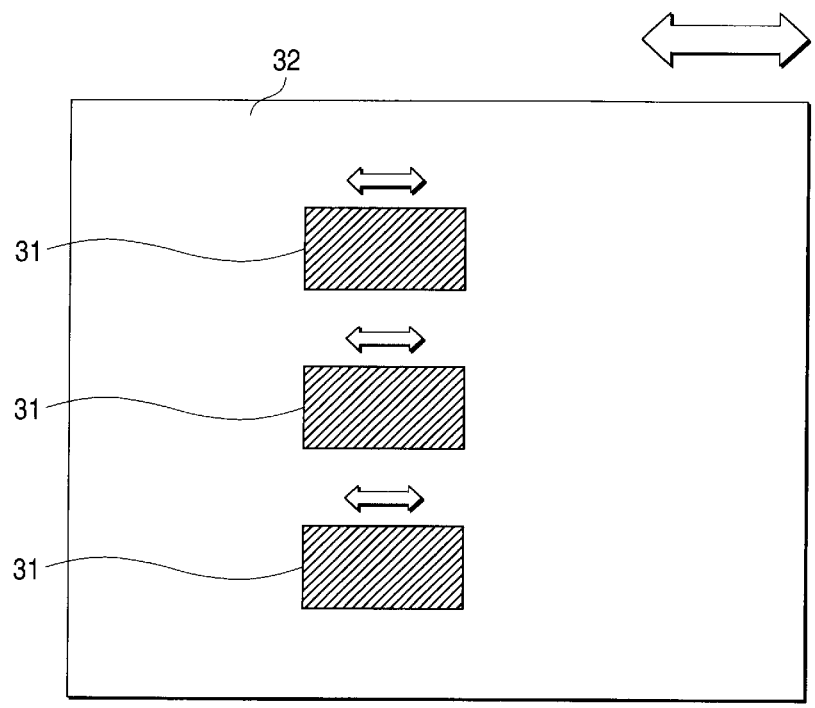
FIGS. 12A and 12B are views showing a configuration in which a linear movable shaft is moved by a plurality of motion modules.
Figure 12B:
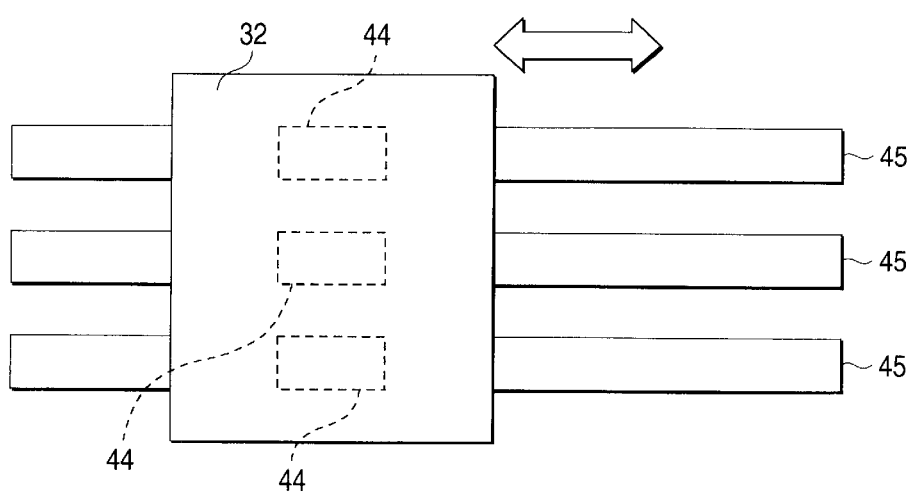
Figure 13:
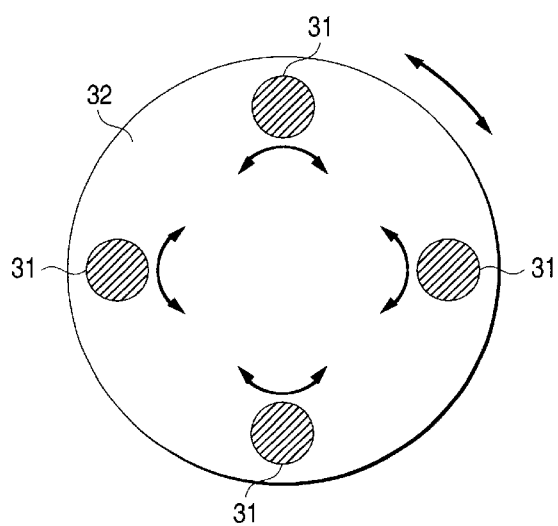
FIG. 13 is a view showing a configuration in which a rotationally movable shaft is moved by a plurality of motion modules.
Figure 14:
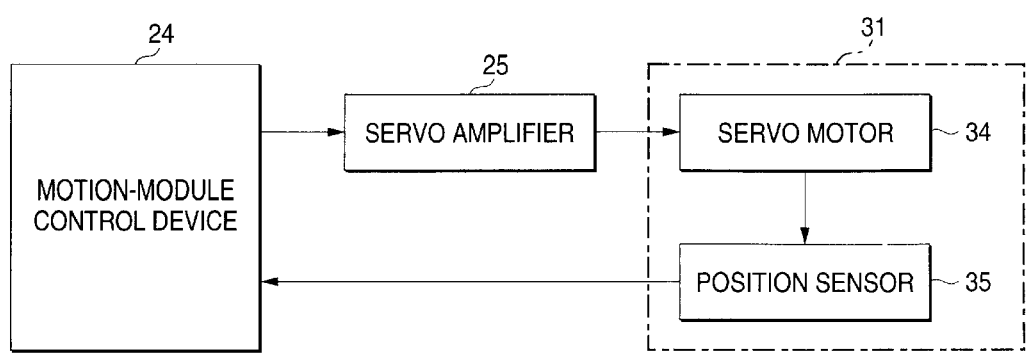
FIG. 14 is a block diagram showing operational connection of the motion modules.

FIG. 1 is a block diagram showing a hardware of a numerical control system according to the present invention. Merely portions from the shaft control circuit 23 to movable shafts 32 are different from FIG. 9 that is the block diagram showing the hardware of the numerical control system in the prior art. Therefore, only the portions that are different from FIG. 9 will be explained hereunder. The shaft control circuit 23 receives the moving command of each movable shaft from the microprocessor 12, and then outputs such moving command of each movable shaft to a motion-module control circuit 24. The motion-module control circuit 24 distributes the moving command to the servo amplifier 25, which controls the motion modules corresponding to each movable shaft, respectively. The servo amplifier 25 receives the distributed moving command and then drives respective motion modules 31. Accordingly, each movable shaft 32 can execute the movement instructed by the moving command.

Figures 2A, 2B:
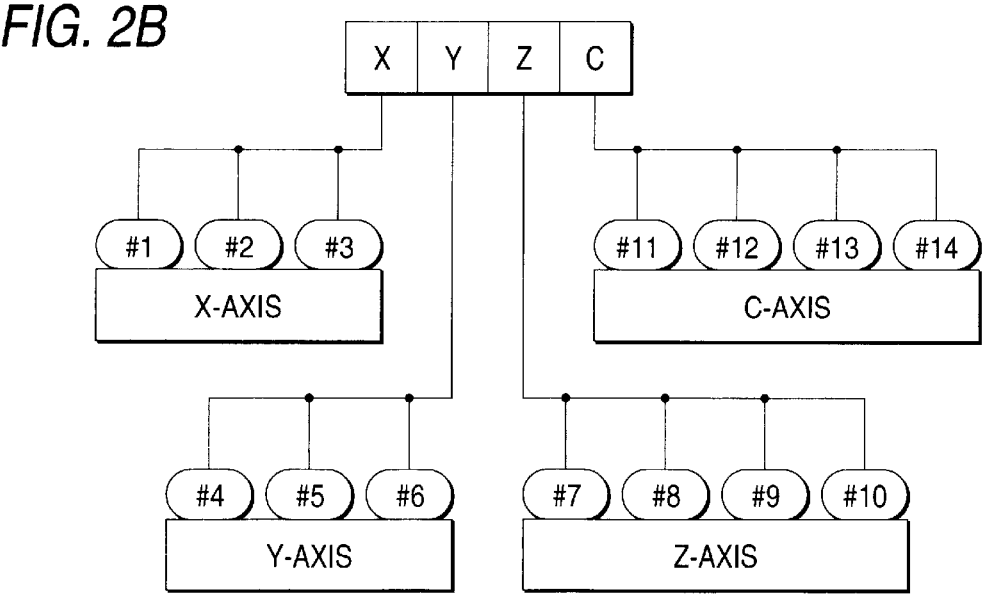
FIG. 2A is a view showing a movable-shaft correlation table.
FIG. 2B is a conceptual view showing correlations between movable shafts and motion modules, which correspond to an example set in FIG. 2A.

FIG. 2A is a view showing a movable-shaft correlation table. In the movable-shaft correlation table (40), it can be set every motion module (41) which motion modules (41) correspond to the movable shafts (42). While using the operation board 22 on the numerical control system 10 as the setting means, the operator decides this setting via the operation board 22 to conform to the configuration of the machine (which motion modules correspond to each shaft). The set data are stored/saved in the CMOS 15 of the numerical control system 10. Also, the movable-shaft correlation table 40 has a failure occurring flag (43) every motion module, and can be constructed to store whether or not each motion module (41) is defective.

FIG. 2B shows correlations between movable shafts and the motion modules, which correspond to the example set in FIG. 2A. In this set example, the X-axis of the movable shaft consists of three motion modules of the motion modules #1, #2, #3. In the following, similarly the Y-axis consists of the motion modules #4, #5, #6, the Z-axis consists of the motion modules #7, #8, #9, #10, and the C-axis consists of the motion modules #11, #12, #13, #14. In the above set example, X, Y, Z, C are set such that they are neatly aligned in number order of the motion modules. However, since the movable-shaft correlation table sets the correspondence between the motion modules and the actual movable shafts, such correspondence may be set simply to meet with the actual configuration of the machine.

Figure 3:
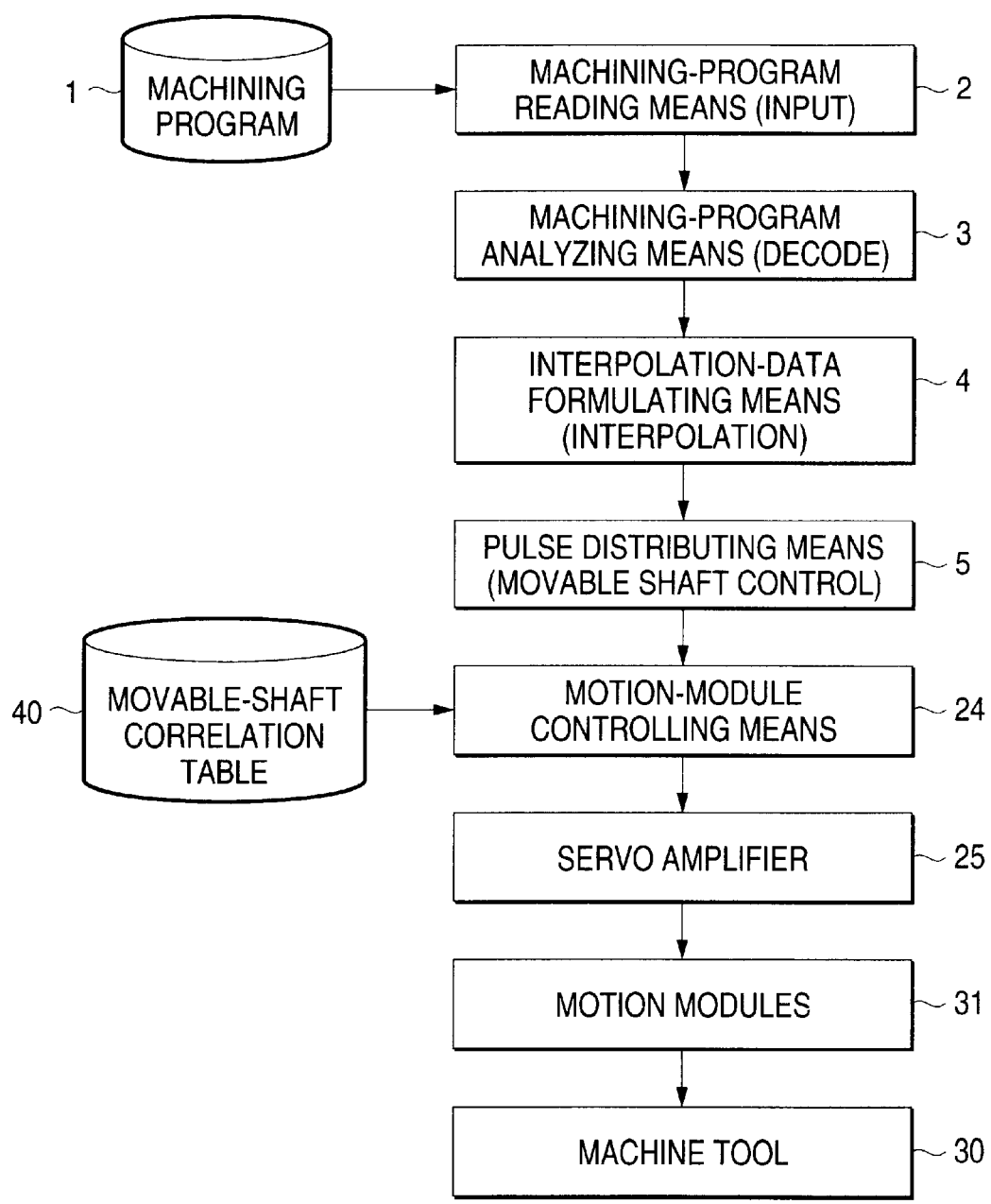
FIG. 3 is a block diagram concerning a moving command.

FIG. 3 is a block diagram concerning the moving command of the present invention. These processes are carried out by the microprocessor 12 and the system program that is stored in the ROM 13. A machining-program reading means 2 reads a machining program 1 stored in the CMOS 15, and then a machining-program analyzing means 3 analyzes this program. The moving command of each movable shaft is extracted according to analyzed results of the machining-program analyzing means 3. A interpolation-data formulating means 4 extracts a moving amount of each movable shaft per unit time based on the moving command of each movable shaft extracted by the machining-program analyzing means 3. A pulse distributing means 5 extracts the moving command with respect to each movable-shaft in the servo system from the extracted moving amount of each movable shaft per unit time.

A motion-module controlling means 24 looks for the correspondences between the movable shafts and the motion modules, that are set in a movable-shaft correlation table 40, in response to the extracted moving command with respect to each movable shaft in the servo system, and then outputs the moving command with respect to respective motion modules to the servo amplifier 25 with respect to respective motion modules. The servo amplifier 25 with respect to respective motion modules can servo-control the motion modules 31 based on the given command. The movement of each shaft of the machine tool 30 is executed based on these motions of respective motion modules.

Figure 4:
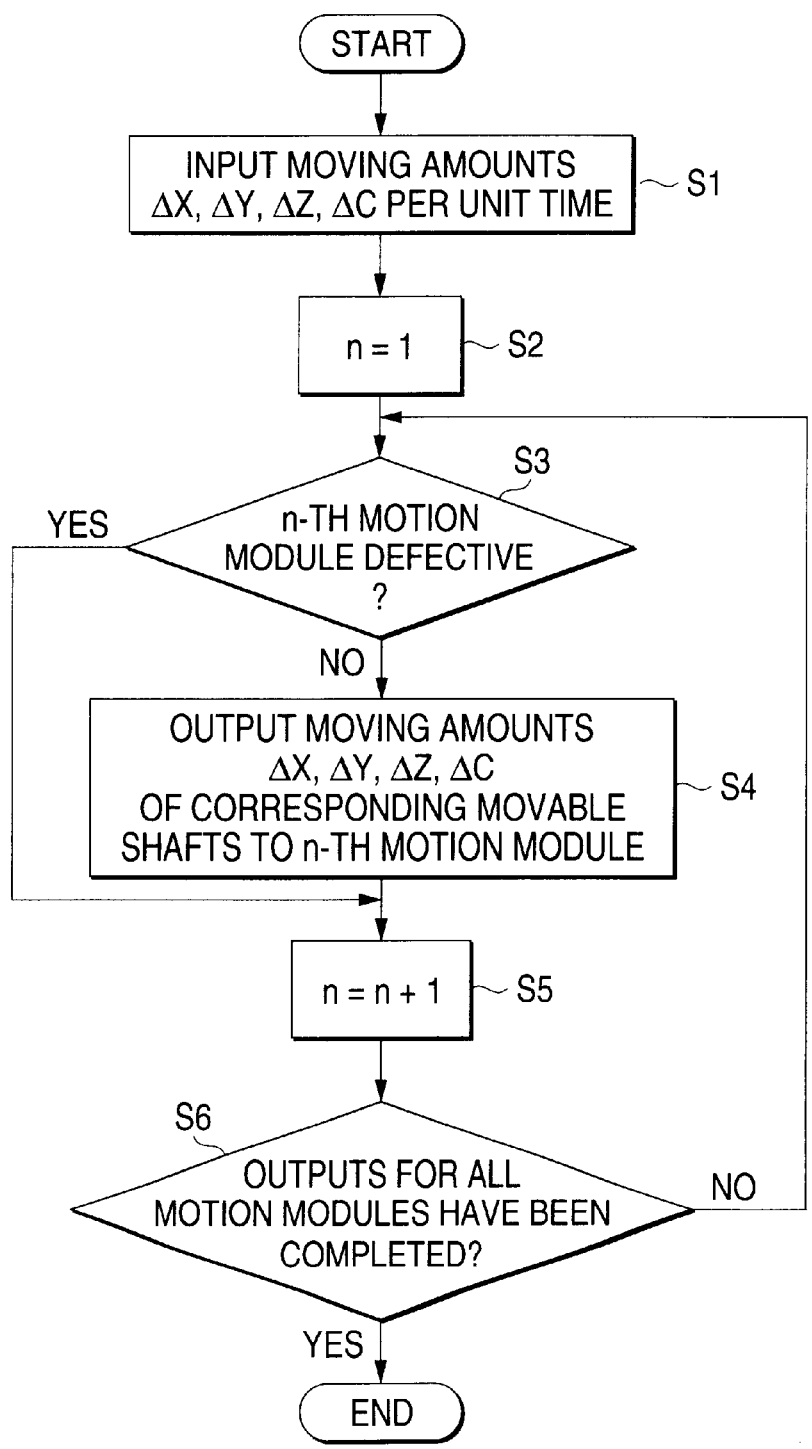
FIG. 4 is a flowchart concerning the moving command for the motion modules.

FIG. 4 is a flowchart concerning the moving command for the motion modules. First, the moving amounts (ΔX, ΔY, ΔZ, ΔC) per unit time, which are supplied to the servo system responding to respective movable shafts, are input (S1). The number [n] of the motion module that executes the process is initially set to 1 (S2).

It is checked whether or not the n-th motion module is defective (S3). This check is executed by the failure occurring flag in the movable-shaft correlation table 40 shown in FIG. 2A. That is, it can be checked that the motion module is normal if the failure occurring flag 43 is "0" while the motion module is defective and cannot be used if the failure occurring flag 43 is "1". S4 is executed unless the n-th motion module is defective, while S5 is executed if the n-th motion module is defective.

In other words, the moving amount of the corresponding movable shaft is output to the n-th motion module in the servo system from the movable-shaft correlation table 40 shown in FIG. 2A (S4). For example, if n=7 in FIG. 2A, the corresponding movable shaft is designated as "Z" and therefore the value AZ assigned to the movable shaft Z is output to the motion module #7.

The processes with respect to one motion module are completed. Therefore, in order to shift to the process of the subsequent motion module, the number [n] of the motion module that executes the process is incremented by one (S5). It is checked whether or not the output process for all motion modules have been completed (S6). This can be checked by deciding whether or not the number [n] of the motion module that executes the process exceeds the number of existing motion modules. Again S3 is executed unless the output processes with respect to all motion modules are completed, while the process is ended if the output processes with respect to all motion modules are completed.

According to the processes shown in the flowchart concerning the moving commands to the motion modules of FIG. 4, the command that is assigned to each movable shaft in the servo system can be output to respective motion modules in response to the contents set in the movable-shaft correlation table 40. As a result, the machine tool in which one movable shaft consists of a plurality of motion modules can also be controlled by the similar machining program to that applied to the conventional machine tool in which each movable shaft consists of one motion module.

In the prior art, in order to move the movable shaft X, the moving amount ΔX per unit time is instructed to the motion module MX with respect to the movable shaft X. In the present invention, if the motion modules with respect to the movable shaft X consist of three modules MX1, MX2, MX3, the same command value ΔX is instructed to three motion modules MX1, MX2, MX3 at the same timing in the same way as that the moving amount ΔX per unit time is instructed to the motion module MX with respect to the movable shaft X in the prior art. Respective motion modules MX1, MX2, MX3 try to move the movable shaft X by the instructed moving value ΔX respectively.

In this manner, the movable shaft X receives the same force from the motion modules MX1, MX2, MX3 at the same timing and is then moved by the moving amount ΔX per unit time. In this case, the torque required for each motion module can be reduced to ⅓ rather than the case where the movable shaft X is moved by one motion module in the prior art. As a result, the movable-shaft controlling portion, which is constructed by one large-capacity motion module in the prior art because the large torque is required to move the movable shaft X, can be constructed by a plurality of small-capacity motion modules.

Figure 5A:
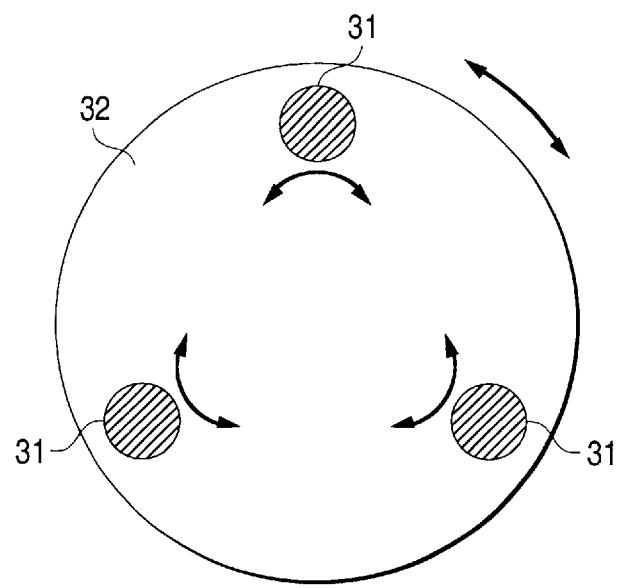
FIGS. 5A and 5B are views illustrating a redundancy of the motion modules respectively.
Figure 5B:
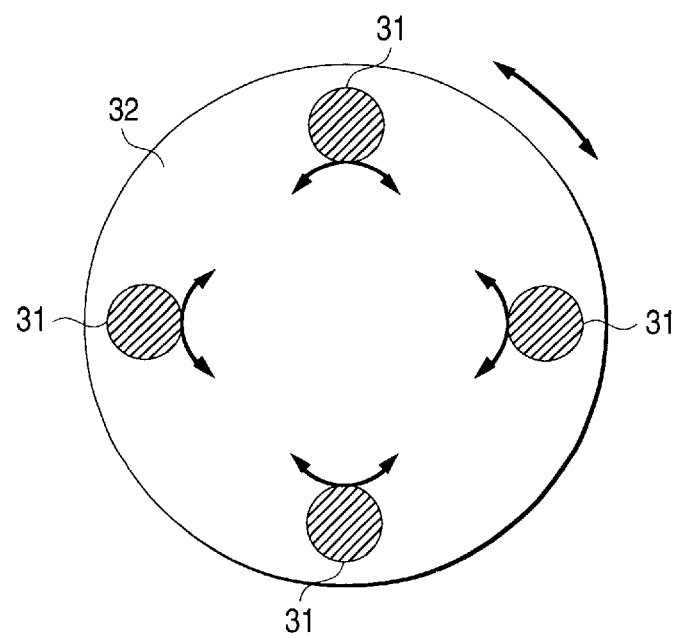

FIGS. 5A and 5B are views illustrating a redundancy of the motion modules. As shown in FIG. 5A, if three motion modules 31 are enough to control one movable shaft 32 in light of the capacity of the motion module 31, the number of the motion modules is increased by one and then the movable shaft 32 is controlled by four motion modules, as shown in FIG. 5B. In this fashion, in the case that the movable shaft is controlled by an excessive number of motion modules, it is possible to control such movable shaft even if the motion modules are wrong within the necessary number.

Figures 6, 7:
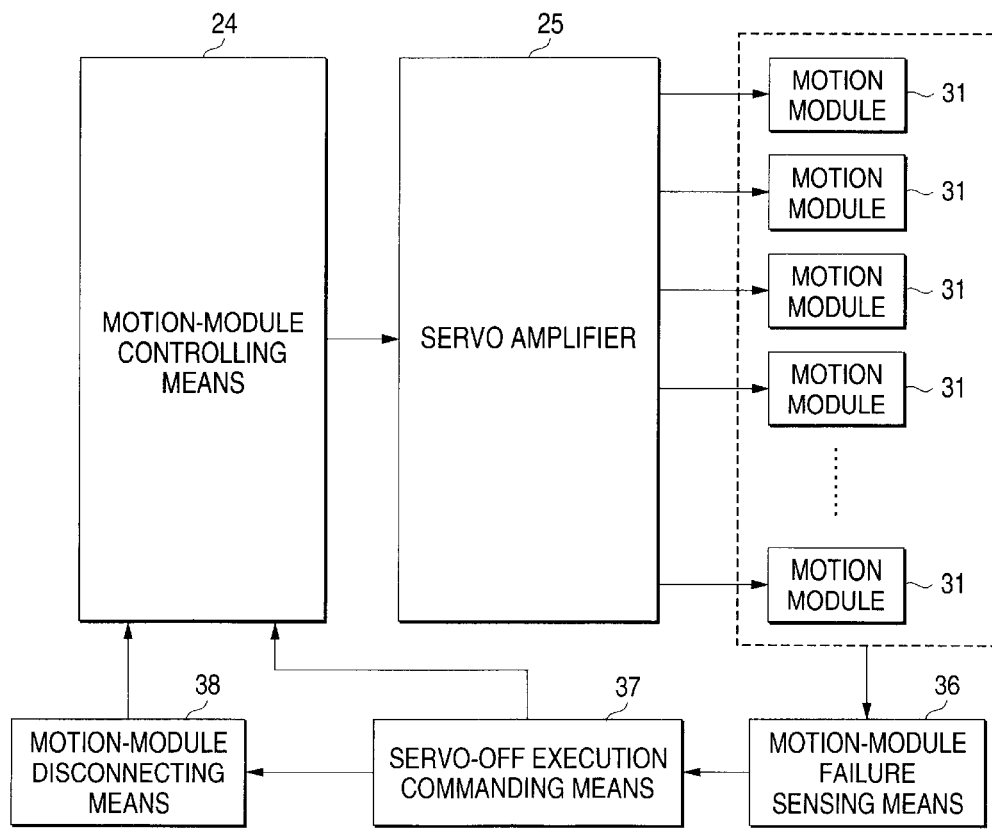
FIG. 6 is a view showing a disconnectable shaft number setting table.
FIG. 7 is a block diagram concerning disconnection of the motion modules.

FIG. 6 is a view showing a disconnectable shaft number setting table. The number (52) of the disconnectable shafts indicating how many motion modules can be disconnected from each movable shaft (51) can be set in the disconnectable shaft number setting table (50). The number of the disconnectable shaft is decided based on how many number of the motion module can be assigned to each movable shaft as the redundancy, as shown in FIGS. 5A and 5B. Also, the number (53) of the defective motion modules that have been actually disconnected is stored in this disconnectable shaft number setting table (50). If the number (53) of the defective motion modules exceeds the number (52) of the disconnectable shafts, it is impossible to control the movable shaft and thus the error must be issued.

FIG. 7 is a block diagram concerning the disconnection of the motion modules. If the failure is caused in the motion module 31, a motion-module failure sensing means 36 senses this failure. If the failure is sensed, a servo-off execution commanding means 37 output the servo-off command to the motion-module controlling means 24. Accordingly, the defective motion module 31 becomes servo-off and thus the defective motion module 31 is brought into the free running state. Also, a motion-module disconnecting means 38 gives the disconnection command of the defective motion module 31 to the motion-module controlling means 24. If receives the disconnection command, the motion-module controlling means 24 controls not to feed the subsequent moving commands to the defective motion module 31.

Figure 8:
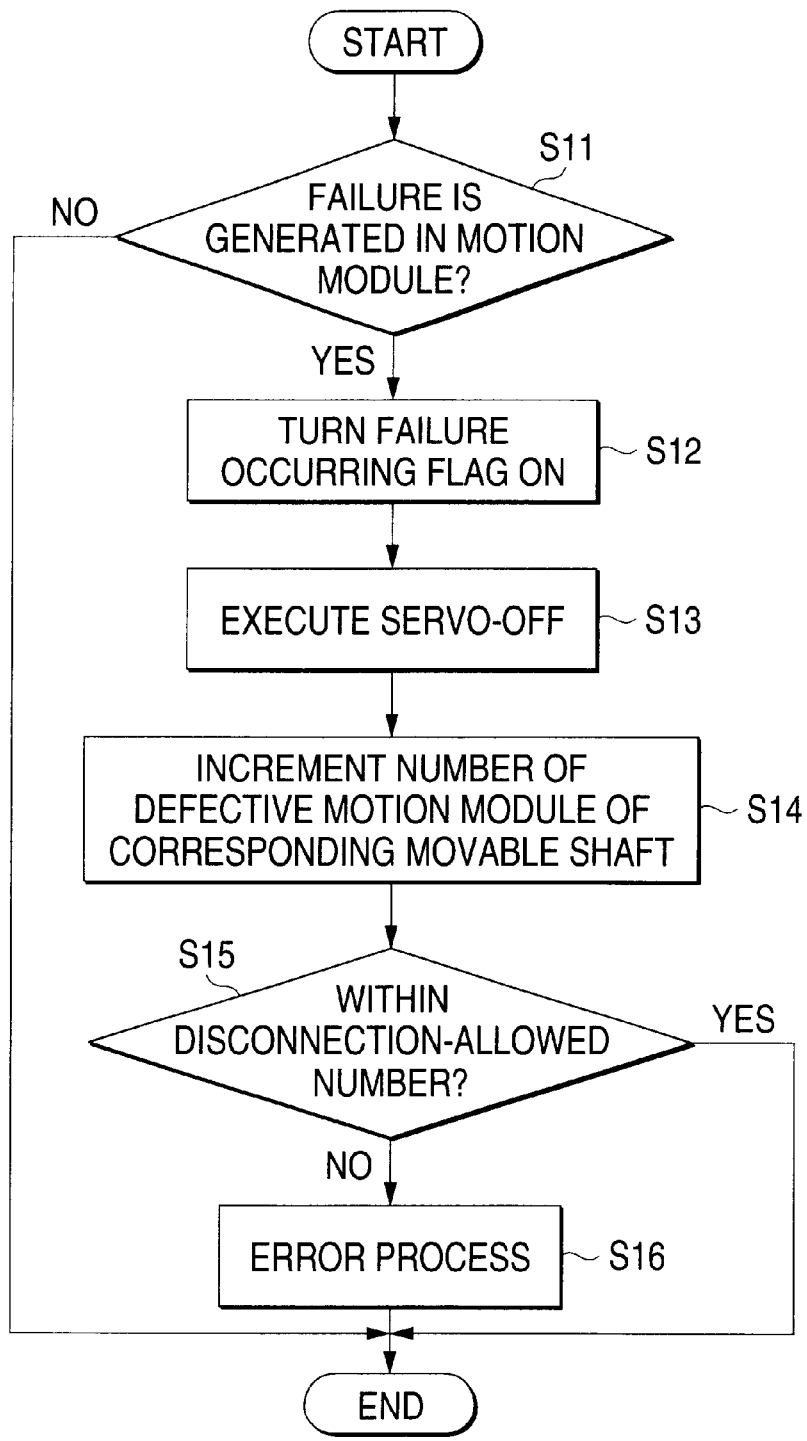
FIG. 8 is a flowchart concerning the disconnection of the motion modules.

FIG. 8 is a flowchart concerning the disconnection of the motion modules. These processes are executed by the microprocessor 12 and the system program stored in the ROM 13. The process is executed from the step of deciding whether or not the failure is generated in the motion module 31 (S11). Unless there is no failure, the process is ended. If the failure is generated in the motion module 31, the failure occurring flag of the motion module 31 in which failure is generated is turned ON (S12). This means that the failure occurring flag (43) of the corresponding motion module (41) in the movable-shaft correlation table (40) is turned ON. Then, the servo-off of the defective motion module 31 is executed (S13). As a result, the defective motion module 31 becomes the servo-off state and thus is brought into the free-running state.

The number of the defective motion modules for the movable shaft corresponding to the defective motion module 31 is incremented by one (S14). This means that the value of the number (53) of the defective motion modules for the corresponding movable shafts (51) in the disconnectable shaft number setting table (50) is increased by one. Then, it is checked whether or not the number of the defective motion modules has exceeded the disconnection-allowed number of the movable shafts corresponding to the defective motion module 31 (S15). This is decided based on whether or not the number (53) of the defective motion modules for the corresponding movable shafts (51) in the disconnectable shaft number setting table (50) has exceeded the number (52) of the disconnectable shafts. As a result, if the number (53) of the defective motion modules is within the disconnection-allowed number, the process is ended. If the number (53) of the defective motion modules has exceeded the disconnection-allowed number, S16 is executed.

If the number (53) of the defective motion modules has exceeded the disconnection-allowed number, the error process (alarm generation) is carried out (S16). This is because the motion module 31, to which the movable shaft for the defective motion module 31 correspond in excess of the redundancy, becomes defective to thus make the control of the movable shafts impossible. Accordingly, the subsequent machining cannot be executed. Conversely speaking, even if the failure is generated in the defective motion module 31 within the disconnection-allowed number, such failure has no influence upon the control of the movable shafts and thus the machining can be continued.

Other Embodiment

Explanation of the embodiment of the present invention is given as above, but the present invention is not limited to the above embodiment. For example, in the above embodiment, the correspondence between the movable shaft and the motion modules is set to 1:3 or 1:4 in number. However, the correspondence of 1: plural may be employed.

As described above, according to the present invention, even in the configuration in which one movable shaft can be moved by a plurality of motion modules, the machining can be carried out by defining the machining of the movement of the movable shaft like the machining program in the prior art. Thus, there is no necessity for the programmer to take account of the configuration between the movable shafts and the corresponding motion modules.

Also, in the event that the numerical control system is constructed to have the redundancy of the motion modules corresponding to the movable shafts, the machining can be continued as it is not to immediately stop all shafts even if the motion modules are defective within the range of the redundancy. Therefore, the reliability of the overall system can be improved.

Industrial Applicability

As described above, the numerical control system according to the present invention is suitable for the shaft control in the numerical control system in which the small and high-performance motion modules such as the linear motor and the microprocessor can execute the high-speed processing to simultaneously control a plurality of movable shafts in the situation that each movable shaft is moved by a plurality of motion modules.

What is claimed is:

1. A numerical control system (10) in which one movable shaft (32) is moved by a plurality of motion modules (31), comprising:

a storing means (15) for storing a machining program (1) for the movable shaft (32);

a storing means (15) for storing a movable-shaft correlation table (40) that converts a moving command given in unit of the movable shaft (32) based on the machining program (1) into individual moving commands of the motion modules (31); and a motion-module controlling means (24) for controlling the motion modules (31) based on the moving commands converted by the movable-shaft correlation table (40).

2. A numerical control system according to claim 1, further comprising:

a setting means (22) for setting correlations between the movable shaft (32) and a plurality of motion modules (31) into the movable-shaft correlation table (40).

3. A numerical control system according to claim 1, further comprising:

a failure sensing means (36) for sensing a failure of the motion modules (31);

a servo-off execution commanding means (37) for providing a servo-off command that executes servo-off of a defective motion module (31) when the failure is sensed; and a motion-module disconnecting means (38) for disconnecting the defective motion module (31).

4. A numerical control system according to claim 3, wherein the servo-off execution commanding means (37) executes the servo-off of the defective motion module (31) and brings the defective motion module (31) into a free-running state.

5. A numerical control system according to claim 3, further comprising:

a disconnectable shaft number setting table (50) for setting a number of disconnectable motion modules (31) every movable shaft (32) that is moved by a plurality of motion modules (31); and an alarm outputting means (12, 13) for outputting an alarm when a number of the motion modules (31), which are disconnected since the failure is caused therein, exceeds a value that is stored in the disconnectable shaft number setting table (50).

6. A shaft control method in a numerical control system comprising the steps of:

obtaining a moving command given in unit of the movable shaft (32) based on a machining program (1);

converting the moving command into individual moving commands of a plurality of motion modules (31), which move the movable shaft (32), based on a movable-shaft correlation table (40); and controlling respective motion modules (31) based on individual converted moving commands of the motion modules (31).

* * * * *